United States Patent Office 3,733,417
Patented May 15, 1973

3,733,417
METHODS AND COMPOSITIONS FOR IMPROVING FEED EFFICIENCY OF RUMINANTS USING POLYHALOALKAMINES
Roger C. Parish, King of Prussia, and John E. Trei, Malvern, Pa., assignors to Smith Kline & French Laboratories, Philadelphia, Pa.
No Drawing. Filed Dec. 19, 1969, Ser. No. 886,794
Int. Cl. A61k 27/00
U.S. Cl. 424—322      17 Claims

ABSTRACT OF THE DISCLOSURE

Methods and compositions utilizing polyhaloalkamine derivatives improve the feed efficiency of commercial ruminant animals by inhibiting methanogenesis in the rumen. A preferred compound to be used as an active ingredient is N - (2,2,2 - trichloro-1-hydroxyethyl)acetamide.

---

This invention comprises new ruminant feed compositions and new methods of improving feed efficiency in ruminants using polyhaloalkamine derivatives as active ingredients. More specifically the active ingredients may be described as the condensation products of polyhaloacetaldehydes with amines or amides generically called polyhaloalkamines or acyl derivatives thereof. Also included are the dehydro derivatives of polyhaloalkamines. More specifically the preferred compounds are polyhalo-1-hydroxyethylamine derivatives especially the N-lower acyl derivatives. The term "polyhalo" is meant to include di- and tri-bromo or chloro. The term "alkamine" is used to mean hydroxyalkylamines (se for example Whitmore's "Organic Chemistry," page 392).

Improvement of the feed efficiency of ruminant animals is an important commercial objective. If the cow or sheep grows more on the same or less feed the cost of meat per pound to the farmer is decreased. In our copending applications Ser. No. 881,868 filed Dec. 3, 1969 and Ser. No. 881,915 filed Dec. 3, 1969, now Pat. No. 3,615,649, to which reference under Rule 78 is given, we described our finding that low doses of haloacetaldehydes and their derivatives improved the feed efficiency of ruminant animals without causing overt therapeutic activity or without inhibiting the overall fermentation activity of the rumen.

We have now found that polyhaloalkamine derivatives administered per os effectively inhibit methanogenesis in the rumen possibly by interrupting the methylcobalamine to methane plus vitamin $B_{12}$ cycle thereby conserving energy source mediators such as ATP for more productive work. The net effect in the rumen is to reduce the production of methane and to produce a higher ratio of the desirable fatty acids especially propionic and butyric acids. These are more readily utilized by the ruminant to increase the efficiency of rumen digestion of feed.

Our discovery that polyhaloalkamines have activity in increasing the feed efficiency of ruminant animals by inhibiting methanogenesis has been confirmed using standard in vitro and in vivo tests. The activity is believed due to the polyhaloalkyl portion of these structures and the preferred compounds to be used in this invention are those most easily prepared from inexpensive starting materials which have a high proportion of halogen content and which are not toxic or noxious to the animal at levels in feed compositions which demonstrate increased feed efficiency. The term polyhalo alkamine is used to represent, in this case, 1-hydroxyethylamines as per

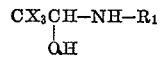

The polyhaloalkamine ingredients used in the methods and compositions of this invention may be illustrated by the following structural formula:

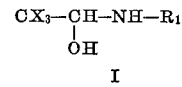

in which:

X is hydrogen, bromo or chloro, at least two of which are bromo or chloro;
$R_1$ is hydrogen, phenyl, lower alkyl or $-COR_2$; and
$R_2$ is hydrogen, lower alkyl, phenyl, amino, lower alkylamino, lower acylamino or lower alkoxy.

For practical purposes the moiety represented by $R_1$ should be limited to 18 carbon atoms, most preferably to 6. The terms "lower alkyl, lower acyl or lower alkoxy" where used in the disclosure and in the claims once again for practical purposes is limited to similar carbon ranges but the most preferred compounds from a cost standpoint are those derived for alkanes of a maximum of six carbon atoms especially those with 1–3 carbon atoms such as methyl, ethyl, propyl, acetyl, methoxy and ethoxy. From this description, it will be apparent that the activity of the compounds is derived from the polyhaloalkane skeleton and that the remaining portion of the compounds' structure may vary widely with retention of qualitative activity.

One skilled in the art will recognize also that O-lower acyl, O-lower alkyl or dehydro derivatives of the polyhaloalkamines of Formula I can also be prepared. These derivatives in our experience are equi-active with the parent compounds and offer no apparent advantages thereover in activity. The carbon limitation of these compounds is the same as discussed above.

The polyhaloalkamine derivatives of Formula I may also have heterocyclic, simple in practice, moieties as $R_1$ or the $R_1$ group may form a heterocyclic group taken together with the nitrogen and oxygen atoms of the polyhaloalkamine. Examples of these are pyrrolidinyl, oxopyrrolidinyl, piperidinyl, nicotinoyl, oxazolyl, furyl, morpholinyl, thienyl, pyrroyl, etc. Also useful as active ingredients in this invention are polyhaloalkamines derived from longer chain polyhaloaldehydes such as butyl chloral or 2,2,3-trichloropropionaldehyde but no advantage is apparent from a cost viewpoint. It will be obvious that $R_1$ may also be part of a disubstituted amino group as long as the second $R_1$ group is not another acyl group. These compounds have no particular advantage over those in Formula I. These compounds all demonstrate activity in increasing feed efficiency when used as active ingredients in the compositions and methods of this invention. It will also be recognized by those skilled in the chemical art that the parent polyhaloalkamines of Formula I in which $R_1$ is hydrogen are quite unstable and must be prepared and used with care. They may exist in most stable form as dimers or trimers. [See Beilstein 1, 624, 1330, II681; O. Aschan. Ber., 48 874 (1915)].

A most preferred type of structure from the viewpoint of activity, simplicity of structure, stability and economy of preparation is:

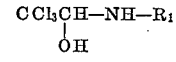

in which $R_1$ is acetyl, propionyl, carbethoxy, carbomethoxy and carbamyl. The compound in which $R_1$ is acetyl, by name N-(2,2,2-trichloro-1-hydroxyethyl)acetamide, is particularly useful.

The polyhaloalkamine compounds which are the active ingredients in the claimed methods and compositions for improving feed efficiency are known and are prepared by synthetic methods familiar to the art. Most useful is a simple reaction of a polyhaloacetaldehyde or its hydrate with an amino containing reactant;

$$CX_3-CHO + NH_2-R_1$$

in which X and $R_1$ are as described above. Also, the art recognizes that reaction between a polyhaloacetaldehyde and disubstituted amino containing reactant [NH—$(R_1)_2$, e.g. acetanilide] is also possible but leads to compounds of no particular advantage over those more completely described here.

Usually the aldehyde is reacted with the nitrogen compound with heat. Often an excess of aldehyde is present. In some cases a suitable organic solvent such as toluene or benzene is present or perhaps an acid catalyst.

The O-acyl or O-alkyl derivatives are prepared by common acylation reactions as with an anhydride or chloride or alkylation reactions such as with dimethylsulfate. The dehydro or anhydro derivatives are prepared by dehydration of the alkamine using an anhydride, heat or more vigorous dehydrating agents such as phosphorous pentoxide. At times the dehydro derivatives are produced directly from reacting a polyhaloacetaldehyde with the nitrogen compound (NH$_2$—R$_1$) in benzene or toluene distilled over a water trap without isolating the hydroxy compound.

Exemplary of polyhaloalkamine compounds which can be used in the methods and compositions of this invention and literature references therefore are the following:

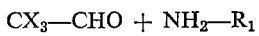

CH$_3$—CH—NH—R$_1$
     |
     OH

| CX$_3$ | —NHR$_1$ | Reference |
|---|---|---|
| CCl$_3$ | NH$_2$ | Beil. 12, 187, 1168 |
| CCl$_3$ | NHNHCONH$_2$ | C.A. 52, 11083 |
| CCl$_3$ | NHNHCSNH$_2$ | C.A. 52, 11083 |
| CCl$_3$ | NH—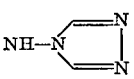 | C.A. 68, 104067 |
| CCl$_3$ | 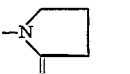 | C.A. 65, 10567 |
| CCl$_3$ | 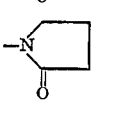 (O-acetate) | C.A. 55, 19778 |
| CHBr$_2$ | NH$_2$ (O-acetate) | Beil. 4, 11808 |
| CCl$_3$ | —NHCOCH$_3$ | C.A. 38, 4372 |
| CCl$_3$ | —NHC$_6$H$_5$ (Sodium sulfonate) | Beil. 12, 187 |
| CCl$_3$ | —NHCOCH$_3$ (O-methyl ether) (O-acetate) | C.A. 66, 75781 Beil. 2, 179 |
| CCl$_3$ | —NHCOC$_2$H$_7$ | C.A. 45, 4391 |
| CCl$_3$ | —NHCOCH$_2$C$_6$H$_5$ | C.A. 56, 5152 |
| CCl$_3$ | —NHCOCHBr$_2$ | C.A. 67, 116036 |
| CCl$_3$ | —NHCO— | C.A. 50, 8745 |
| CBr$_3$ | —NHCOCH$_3$ | C.A. 55, 7550 |
| CBr$_3$ | —NHCOCH$_3$ (O-acetate) | C.A. 29, 137 |
| CBr$_3$ | —NHCOC$_5$H$_{11}$ | C.A. 63, 13070 |
| CBr$_3$ | —NHCOCH=CH$_2$ | C.A. 63, 13070 |
| CCl$_3$ | —NHCONH$_2$ | C.A. 56, 5152 |
| CCl$_3$ | —NHCONH$_2$ (O-ethyl ether) | C.A. 26, 1249 |
| CHCl$_2$ | —NHCONHCH$_2$CH=CH$_2$ | C.A. 63, 13070 |
| CCl$_3$ | —NHCH$_2$Cl | C.A. 61, 11898 |
| CCl$_3$ | —NHCHCl$_2$ | C.A. 61, 11898 |
| CCl$_3$ | —NHCCl$_3$ | C.A. 61, 1898 |
| CBr$_3$ | —NHCOCH$_2$C$_6$H$_5$ | C.A. 55, 7550 |
| CHClCHCl$_2$ | —NHCOC$_6$H$_5$ | C.A. 55, 18572 |
| CCl$_3$ | —NHCONHC$_2$H$_5$ (O-propyl ether) | C.A. 28, 1989 |
| CBr$_3$ | —NHCONHCH$_3$ | C.A. 28, 1989 |
| CBr$_3$ | —NHCONH-Ter.C$_4$H$_9$ | C.A. 63, 13070 |
| CHCl$_2$ | —NHCOOC$_2$H$_5$ | C.A. 63, 13070 |
| CBr$_3$ | —NHCOOC$_3$H$_7$ | C.A. 60, 5378 |
| CCl$_3$ | —NHCOOC$_2$H$_5$ (O-methyl ether) | C.A. 52, 3134 |
| CCl$_3$ | —COOCH$_3$ (O-acetate) | C.A. 32, 3760 |
| CCl$_3$ | —N(C$_6$H$_5$)—COCH$_3$ | C.A. 40, 7181 |
| CCl$_2$—CHCl$_2$ | —NHCOCH$_3$ | C.A. 55, 18572 |
| CCl$_2$CHCl$_2$ | 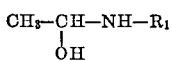 | C.A. 55, 18572 |
| CCl$_2$CHClCH$_3$ | —NHCOCH$_3$ | C.A. 45, 4391 |
| CHCl$_2$ | —NHCOCHBr—CH$_2$Br | C.A. 63, 13070 |
| CBr$_3$ | —NHCHBr—CH$_2$Br | C.A. 63, 13070 |

DEHYDRO PRODUCTS.—CX$_3$C(R$_2$)=N—R$_1$

| CX$_3$ | R$_2$ | R$_1$ | Reference |
|---|---|---|---|
| CCl$_3$ | H | —CH$_3$ | C.A. 67, 53599 |
| CCl$_3$ | H | —C$_4$H$_9$ | C.A. 67, 53599 |
| CCl$_3$ | H | —COOCH$_3$ | C.A. 54, 9750 |
| CCl$_3$ | H | —C$_6$H$_5$ | C.A. 67, 53599 |
| CCl$_3$ | H | —CONH$_2$ | Beil. 3, 128 |
| CCl$_3$ | H | —COCH$_3$ | Beil. 2, 179 |
| CHCl$_2$ | OH | —C$_4$H$_9$ (O-methyl ether) | C.A. 67, 53599 |
| CHCl$_2$ | OH | —C$_6$H$_5$ (O-ethyl ether) | C.A. 67, 53599 |
| CCl$_3$ | H | —c—C$_6$H$_{11}$ | C.A. 67, 53599 |

The chemical compounds of the art outlined above are incorporated into feed or feed premix compositions in effective but nontoxic quantities which increase feed efficiency. The compositions are then fed to ruminant animals as disclosed hereafter. It will be seen from the above examples that generally speaking the active chemical ingredients of this invention are polychloro or bromo containing hydroxyamines, amides, ureas or carbamic acid esters.

The ruminant feeds most generally used in conjunction with the method of this invention are either the roughage feeds such as silage or various commercial grain mixtures commonly used in ruminant animals, that is, in cattle or sheep. The amount of additive used to supplement such feeds will be an amount sufficient to improve the feed efficiency of the animal but not to have a pharmacodynamic or otherwise toxic or noxious effect; in the range of about 2 g. to 2 kg. per ton of feed (about 0.0002–0.2%) preferably from about 50–600 g./ton. An average sheep will ingest about 3–4 lbs. of food daily. An average cow about 20–25 lbs. Therefore, the broad range of dosage for ruminants (sheep and cows) is roughly about 50 mg.–7 g. per day.

For commercial use, the active ingredients are most readily used as premix formulations in which the chemical is distributed uniformly throughout a standard animal feed carrier. This premix or concentrate is then mixed with either a normal or a special fattening diet of the ruminant as desired. Examples of such carriers are soybean meal, corn oil, ground corn, barley, wheat, mineral mixtures such as vermiculite, diatomaceous earth, corn gluten meal, corn distillers solubles or soyflour. The active ingredient will be in amounts to satisfy the criteria set forth above for whole feed. The active ingredient will usually be present in from about 5–75% by weight of the premix composition depending largely on the physical properties of the ingredient.

The animal feeds themselves may also contain cellulosic roughage such as cellulose, hay, straw, corn stalks, cotton seed hulls, oats, barley and cereal brans; natural oils such as animal fats, fish oils, safflower oil, peanut oil and cottonseed oil; antioxidants; minerals; vitamins; antibiotics; anethelmintics; and other appropriate medicaments.

A typical prepared animal feed is as follows:

| | |
|---|---|
| Mixed hay | 40.%. |
| Ground yellow corn | 45.0%. |
| Soybean oil meal | 7.0%. |
| Cane molasses | 7.0%. |
| Dicalcium phosphate | 0.5%. |
| Trace minerals salt | .5%. |
| Vitamin A | 300 I.U./lb. |
| Vitamin D | 150 I.U./lb. |
| N-(2,2,2-trichloro-1-hydroxyethyl) acetamide | 2 lb./ton of feed. |

An example of a suitable premix is as follows:

| | Lb. |
|---|---|
| 2,2,2-trichloro-1-hydroxyethyl urea | 1 |
| Ground yellow corn | To 3 |

Another might be a 50–50 mixture of the urea and vermiculite.

In the field the active ingredients may be administered by means of salt or molasses blocks. A typical block may be prepared using the following conditions:

| Ingredient: | Weight percent |
|---|---|
| Dried cane molasses | 45.54 |
| Ground soybean hulls | 24.90 |
| Ethyl N-(1-hydroxy-2-trichloroethyl) carbamate | 5.00 |
| Granulated salt | 21.59 |
| Trace minerals and vitamins | 0.20 |
| Stabilized animal fat | 1.11 |
| Moisture | 2.66 |

The method of this invention comprises allowing the cattle or sheep to graze or be fed ad libidum on the supplemented rations or to be hand fed on a regular schedule.

Normally we have found feed efficiency increases of from about 5–10% using normal fattening diets and conditions.

The ability of the polyhaloalkamine derivatives of this invention to improve feed utilization in ruminants is primarily evaluated by means of a test which measures in vitro methane gas production plus total gas production as an indicator of the rate of fermentation of feedstuffs by microorganisms of the rumen. Rumen fluid is obtained from a fistulated animal and is filtered through six layers of cheesecloth. The fluid (75 ml.) is then added to 2.4 g. of experimental ration as substrate. Test compound is then added and the mixture is incubated for 3 hours. Test compound may be added as such or, particularly when used in quantities as small as 10 p.p.m. or less, suspended or dissolved in a solvent such as water or ethanol. At the end of the test period, the trapped gases are sampled by hypodermic needle from the flask and run through a gas partitioner (column chromatography) which separates and quantitates the components. The liquids (volatile fatty acids, etc.) are analyzed by gas liquid chromatography. Among the products measured are carbon dioxide, lactic acid, ethanol, hydrogen and fatty acids having from 2 to 6 carbon atoms. Reduction in the percent methane produced of 20% is considered significant. However, with compounds used in the present invention, reduction of 90–100% without reduction of overall fermentation is not uncommon. Ability of a particular compound to reduce the amount of methane generated without adversely reducing the overall rate of fermentation is determined by comparing the total ($\mu$moles/ml.) volatile fatty acids produced in control systems with those containing test compound. Also most significant is the distribution of fatty acids obtained.

The effect of the polyhaloalkamine derivatives of this invention in reducing methane production without causing a reduction in the rate of overall fermentation at effective concentrations, when tested by the above procedures, is shown by the data below.

A predetermined molar or percent concentration of test compound in water or ethanol was administered usually in 0.1, 0.5 or 1.0 cc. portions as described above. The data in Table I is for parts of active ingredient per amount of rumen fluid, i.e., parts per million with resulting significant methane inhibition.

TABLE I

| Compound | P.p.m. | Percent methane reduction |
|---|---|---|
| N-(2,2,2-trichloro-1-hydroxyethyl)-acetamide | 13 | 65 |
| | 65 | 85 |
| tert-Butyl (2,2,2-trichloro-1-hydroxyethyl)-carbamate | 13 | 60 |
| | 65 | 90 |
| Ethyl (2,2,2-trichloro-1-hydroxyethyl)-carbamate | 130 | 90 |
| (2,2,2-trichloro-1-hydroxyethyl)urea | 280 | 90 |
| (2,2-dichloro-1-hydroxyethyl)urea | 240 | 30 |
| N-(2,2,2-trichloro-1-hydroxyethyl)-1-ethylbutyramide | 130 | 95 |
| N-(2,2,2-trichloro-1-hydroxyethyl)-2-diethylaminoacetamide, hydrochloride (from chloral and the amide) | 130 | 80 |
| N,N',3-tris(2,2,2-trichloro-1-hydroxyethyl)-malonamide | 65 | 85 |
| 4-[(2,2,2-trichloro-1-hydroxyethyl)-amino]-4H-1,2,4-triazole (by dehydrating alcohol) | 65 | 80 |
| N-(2,2,3-trichloro-1-hydroxybutyl)-butyramide | 130 | 30 |
| N-(2,2,2-trichloro-1-hydroxyethyl)-nicotinamide | 13 | 85 |
| 1-(2,2,2-trichloro-1-hydroxyethyl)-2-pyrrolidinone | 65 | 100 |
| 1-(1-acetoxy-2,2,2-trichloroethyl)-2-pyrrolidinone | 13 | 85 |
| 2,2,2,2',2',2'-hexachloro-1,1'-bis-(ethoxyformamido)-ethyl ether | 130 | 80 |
| Dihydro-6-trichloromethyl-2H-1,3,5-oxadiazine-2,4(3H)dione | 65 | 80 |
| N,N'-(2,2,2-trichloroethylidene)-dianiline | 65 | 70 |
| 1,3-bis(2,2,2-trichloro-1-hydroxyethyl)urea | 200 | 90 |
| N-(2,2,2-trichloro-1-hydroxyethyl)-benzilamide | 13 | 60 |
| | 65 | 90 |
| $\alpha$-methyl-N-(2,2,2-trichloroethylidene)-phenethylamine | 65 | 95 |

The results of in vitro tests which correlate methane inhibition with a desired shift in ratio of fatty acid production in the rumen to the more efficiently utilized acids especially propionate is presented in Table II. This represents the analysis of rumen content evaluated statistically which results from the substantially complete inhibition of rumen methanogenesis by the derivatives noted above which is achievable using this invention.

TABLE II

| | Controls | Treated |
|---|---|---|
| Molar percent: | | |
| $C_2$ fatty acids | 54–57 | 50–52 |
| $C_3$ fatty acids | 21–23 | 25–28 |
| $C_4$ fatty acids | 15–18 | 19–22 |
| $C_5$ or higher fatty acids | (1) | (1) |
| Total $\mu$ moles/ml | 68–72 | 67–74 |

1 Remainder to 100%.

The in vitro data presented above was confirmed by in vivo tests as follows:

Each dose level represents a test group of four head of pinhole fistulated sheep. The animals were fed the additive mixed with morning and evening feed in quantities so that 90% ad libidum amounts were administered. The sheep would eat all the supplemented food in one hour. The results ran for a 7-day period.

Samples were withdrawn from the rumen 4–5 hours after the morning feeding and again 12–15 hours after the evening feeding. The ration was 90% roughage-10% concentrate. Analysis of the samples by gas partitioner and G.L.C. for gas and fatty acid content were carried out.

TABLE III

N-(2,2,2-trichloro-1-hydroxyethyl)acetamide (1.44 g./day)

| | Control | Treated |
|---|---|---|
| Molar percent: | | |
| $C_2$ | 81 | 64 |
| $C_3$ | 13 | 19 |
| $C_4$ | 4 | 16 |
| $C_5$ | 2 | 1 |
| Total $\mu$ moles/ml | 52 | 55 |

This data in sheep confirms the in vitro results present hereabove.

What we claim is:

1. The method for improving the feed utilization of ruminant animals comprising administering orally in conjunction with the feed to such animals an effective but nontoxic quantity of polyhaloalkamine of the formula:

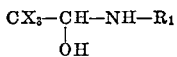

in which:
X is hydrogen, bromo or chloro at least two of which are bromo or chloro;
$R_1$ is hydrogen, phenyl, lower alkyl or $COR_2$; and
$R_2$ is hydrogen, lower alkyl, phenyl, amino, lower alkylamino, lower acrylamino or lower alkoxy, said lower alkyl, lower acyl and lower alkoxy moieties being limited to a maximum of six carbon atoms.

2. The method of claim 1 in which the quantity of polyhaloalkamine administered is from about 2 g. to 2 kg. per ton of feed.

3. The method of claim 1 in which the quantity of polyhaloalkamine administered is from about 50–600 g. per ton of feed.

4. The method of claim 1 in which the quantity of polyhaloalkamine administered is from about 50 mg.–7 g. per animal per day.

5. The method of claim 1 in which X is chloro.

6. The method of claim 1 in which X is chloro and $R_1$ is lower alkanoyl of a maximum of 6 carbon atoms.

7. The method of claim 1 in which the polyhaloalkamine is 1,3-bis(2,2,2-trichloro-1-hydroxyethyl)urea.

8. The method of claim 3 in which the polyhaloalkamine is 1,3-bis(2,2,2-trichloro-1-hydroxyethyl)urea.

9. The method of claim 4 in which the polyhaloalkamine is 1,3-bis(2,2,2-trichloro-1-hydroxyethyl)urea.

10. An animal feed supplemented by the polyhaloalkamine of claim 1 in a quantity from about 2 g. to 2 kg. per ton of feed.

11. An animal feed supplemented by the polyhaloalkamine of claim 1 in a quantity of from about 50 g. to 600 g. per ton of feed.

12. The animal feed of claim 10 in which the polyhaloalkamine is 1,3-bis(2,2,2-trichloro-1-hydroxyethyl)urea.

13. The animal feed of claim 10 in which the polyhaloalkamine is (2,2,2-trichloro-1-hydroxyethyl)urea.

14. The animal feed of claim 15 in which the polyhaloalkamine is (2,2,2-trichloro-1-hydroxyethyl)urea.

15. A premix feed containing from about 5% to about 75% of the polyhaloalkamine of claim 1 dispersed in an animal carrier feed.

16. The premix feed of claim 15 in which the polyhaloalkamine is 1,3-bis(2,2,2-trichloro-1-hydroxyethyl)urea.

17. The premix feed of claim 15 in which the polyhaloalkamine is N-(2,2,2-trichloro-1-hydroxyethyl)acetamide.

References Cited
UNITED STATES PATENTS

| | | |
|---|---|---|
| 2,718,467 | 9/1955 | Belasco et al. _____ 99—2 |
| 3,608,087 | 9/1971 | Patchett et al. _____ 424—320 |

OTHER REFERENCES

J. Sci. Food Agric., 12, August 1961, pp. 542–547.

ALBERT T. MEYERS, Primary Examiner

F. E. WADDELL, Assistant Examiner

U.S. Cl. X.R.

424—263, 269, 274, 300, 320, 324, 325, 330